(12) United States Patent
Xie (10) Patent No.: US 9,693,363 B2
(45) Date of Patent: Jun. 27, 2017

(54) METHOD AND APPARATUS FOR CONTROLLING CLEAR CHANNEL ASSESSMENT THRESHOLD

(71) Applicant: Spreadtrum Communications (Shanghai) Co., Ltd., Zhangjiang, Shanghai (CN)

(72) Inventor: Xin Xie, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 146 days.

(21) Appl. No.: 14/677,299

(22) Filed: Apr. 2, 2015

(65) Prior Publication Data
US 2016/0037537 A1    Feb. 4, 2016

(30) Foreign Application Priority Data
Aug. 1, 2014   (CN) .......................... 2014 1 0378178

(51) Int. Cl.
*H04W 4/00*      (2009.01)
*H04W 72/08*     (2009.01)
*H04L 5/00*      (2006.01)

(52) U.S. Cl.
CPC .......... *H04W 72/082* (2013.01); *H04L 5/001* (2013.01); *H04L 5/006* (2013.01); *H04L 5/0055* (2013.01)

(58) Field of Classification Search
CPC .... H04W 72/082; H04L 5/0055; H04L 5/001; H04L 5/006
See application file for complete search history.

(56) References Cited

U.S. PATENT DOCUMENTS

| | | | | |
|---|---|---|---|---|
| 8,666,319 B2* | 3/2014 | Kloper | .............. | H04W 74/0808 455/63.1 |
| 2005/0152359 A1* | 7/2005 | Giesberts | .............. | H04L 1/0083 370/389 |
| 2013/0017794 A1* | 1/2013 | Kloper | .............. | H04W 74/0808 455/63.1 |
| 2015/0078353 A1* | 3/2015 | Zhang | .............. | H04W 28/0236 370/336 |
| 2016/0037537 A1* | 2/2016 | Xie | ..................... | H04W 72/082 370/329 |

\* cited by examiner

*Primary Examiner* — Robert Wilson
(74) *Attorney, Agent, or Firm* — Cantor Colburn LLP (57) ABSTRACT

Method and apparatus for controlling CCA threshold of a wireless communication channel is provided. The method includes: obtaining a noisy level of the channel based on the number of first data received by a first terminal in a first period, the first terminal being a STA or AP in a wireless network, and the first data include aggregation frames or non-aggregation frames; and adjusting the CCA threshold the first terminal uses in data transmission in a second period based on the noisy level. The first terminal may adaptively detect the noisy level of the channel, and the CCA threshold may be selected reasonably based on the noisy level, which enables the first terminal to obtain an opportunity of accessing the channel in time when it needs to send data, enhance the first terminal's competition ability of occupying channels, and improve a throughput rate.

19 Claims, 5 Drawing Sheets

METHOD AND APPARATUS FOR CONTROLLING CLEAR CHANNEL ASSESSMENT THRESHOLD

CROSS-REFERENCE TO RELATED APPLICATIONS

The present invention claims priority under 35 U.S.C. §119 to Chinese patent application No. 201410378178.X, filed on Aug. 1, 2014, the entire content of which is incorporated herein by reference.

FIELD OF THE DISCLOSURE

The present disclosure generally relates to communication technology field, and more particularly, to a method and an apparatus for controlling a clear channel assessment threshold.

BACKGROUND OF THE DISCLOSURE

Institute of Electrical and Electronics Engineers (IEEE) 802.11 is a set of air interface specifications in wireless local area network developed for Dedicated Short Range Communication (DSRC) by IEEE Committee, which provides wireless network service based on a competition scheme. In IEEE 802.11 wireless network, before transmitting a data packet, a station (STA) or an access point (AP) needs to monitor a channel to determine whether the channel is clear, and if yes, experience a random back-off process. Or else, the STA or AP cannot transmit the data packet and needs to monitor the channel again. The above monitoring scheme is called clear channel assessment (CCA) which is widely used by STAs or APs in IEEE 802.11.

CCA is a physical carrier sense scheme detecting whether a signal exists in a channel through various means. When a signal is transmitted in the channel and the signal has a relatively high power intensity which may affect data transmission of a STA or an AP, the CCA may indicate the channel as in a busy state and enable the STA or AP to restrain the data transmission. When no signal is transmitted in the channel or signals in the channel have relatively low power intensity which may not affect the data transmission of the STA or an AP, the CCA may indicate the channel as in a clear state and enable the STA or AP to obtain an opportunity of accessing the channel and to enter a state of data transmission.

CCA detects signals, which can be realized by various signal detection methods, and estimates the channel state based on the detected signals. A common method is to use the power of a received signal to determine the channel state. For example, the power of the signal received by the STA or AP may be compared with a CCA threshold which is a fixed value determined according to the IEEE 802.11 specifications. If the power of the signal received by the STA or AP is higher than the CCA threshold, it is determined that the channel has a signal and the channel is indicated to be busy; or else, the channel is indicated to be clear.

When the channel has a high noisy level or when the channel is in a quite busy state, i.e., there are plenty of STAs or APs in the wireless communication network and communications are frequent there, if a STA or an AP needs to send data, it may compete with other STAs or APs. In existing techniques, the CCA threshold is a fixed value. Sometimes, when the STAs or APs are located in communication environment with high noisy level, they can hardly obtain an opportunity to access the channel for a long time, which may cause a throughput rate to be low for a long time or even cause a zero throughput rate, thereby, sometimes, an interruption of communication may occur.

SUMMARY

In one embodiment of the present disclosure, a method for controlling a clear channel assessment (CCA) threshold of a wireless communication channel is provided. The method includes: obtaining a noisy level of a channel based on the number of first data received by a first terminal in a first period, where the first terminal is a station (STA) or an access point (AP) in a wireless network, and the first data include aggregation frames or non-aggregation frames; and adjusting the CCA threshold the first terminal uses in data transmission in a second period based on the noisy level of the channel.

Optionally, the noisy level of the channel may decrease with the increment of a first ratio calculated based on Equation (1), $$A = C/B \qquad (1)$$

where A represents the first ratio, B represents the number of the first data received by the first terminal in the first period, and C represents the number of a first set of data among the first data received by the first terminal in the first period, where each MAC target address of the first set of data is the first terminal.

Optionally, the noisy level of the channel may be determined based on a norm of the noisy level of the channel, and the norm of the noisy level of the channel is determined by: obtaining a first number, where the first number represents the number of physical layer protocol data units (PPDUs) received by the first terminal in the first period; obtaining a second number, where the second number represents the number of Acknowledgement (ACK) frames or block ACK frames received by the first terminal in the first period; obtaining a third number, where the third number represents the number of the first data received by the first terminal in the first period which are not ACK frames or block ACK frames and whose MAC target addresses are the first terminal; and if the difference between the first number and the second number is greater than or equal to a first threshold, determining the norm of the noisy level of the channel based on Equation (2), $$\mathrm{CCA\_Freq} = 1 - \frac{\mathrm{Rx\_MPDU\_Cnt}}{\mathrm{Rx\_PPDU\_Cnt} - \mathrm{Rx\_ACK\_Cnt}} \qquad (2)$$

where CCA_Freq represents the norm of the noisy level of the channel, Rx_PPDU_Cnt represents the first number, Rx_ACK_Cnt represents the second number, and Rx_MPDU_Cnt represents the third number.

Optionally, the method may further include: if the difference between the first number and the second number is less than the first threshold, determining the norm of the noisy level of the channel to be zero.

Optionally, the first threshold may be within a range from 1 to 10.

Optionally, adjusting the CCA threshold the first terminal uses in data transmission in the second period based on the noisy level of the channel may include: when the noisy level of the channel is greater than or equal to a noisy level threshold, adjusting the CCA threshold the first terminal uses in data transmission in the second period according to a predetermined controlling value.

Optionally, adjusting the CCA threshold according to the predetermined controlling value may include: if the difference between a first parameter and the controlling value is greater than or equal to a second threshold, determining the CCA threshold to be the difference, where the first parameter is related to powers or signal strength indication values of the PPDUs received by the first terminal in the first period.

Optionally, the first parameter may include an average value of the powers or an average value of the signal strength indication values of the PPDUs received by the first terminal in the first period.

Optionally, adjusting the CCA threshold the first terminal uses in data transmission in the second period based on the noisy level of the channel may further include: if the difference between the first parameter and the controlling value is less than the second threshold, determining the CCA threshold to be the second threshold.

Optionally, adjusting the CCA threshold in the second period based on the noisy level of the channel may further include: when the noisy level of the channel is less than the noisy level threshold, determining the CCA threshold to be the second threshold.

Optionally, the second threshold may be a predetermined CCA threshold value.

Optionally, the noisy level threshold may be within a range from 60% to 100%.

Optionally, the controlling value may be within a range from 4 to 8.

Optionally, the first period and the second period may be within a range from 100 ms to 500 ms.

In one embodiment of the present disclosure, an apparatus for controlling a CCA threshold of a wireless communication channel is provided. The apparatus includes: a noisy level determination unit, configured to obtain a noisy level of a channel based on the number of first data received by a first terminal in a first period, where the first terminal is a STA or an AP in a wireless network, and the first data include aggregation frames or non-aggregation frames; and a threshold adjustment unit, configured to adjust the CCA threshold the first terminal uses in data transmission in a second period based on the noisy level of the channel.

In embodiments of the present disclosure, based on the noisy level of the channel obtained in the first period, the CCA threshold in the second period may be adjusted adaptively. That is, the first terminal may detect the noisy level of the channel, and select the CCA threshold based on the noisy level, which may enable the first terminal to obtain an opportunity of accessing the channel in time when it needs to send data, enhance the first terminal's competition ability of occupying a channel, and improve a throughput rate.

Further, the noisy level of the channel can be effectively detected by using the norm, so that the physical transmission performance of the channel may be reflected more accurately, and further the CCA threshold may be adjusted accordingly. In this way, a suitable CCA threshold may be selected according to a practical state of the channel

DETAILED DESCRIPTION OF THE DISCLOSURE

In existing techniques, the CCA threshold as a fixed value is not adjusted flexibly according to the noisy level or busy level of the channel. Therefore, the STAs or APs, which are located in communication environment having a high noisy level and need to transmit data, can hardly obtain an opportunity to access the channel for a long time, which may cause a throughput rate to be low for a long time or even cause a zero throughput rate, thereby, sometimes, an interruption of communication may occur.

In an embodiment, a method for controlling a CCA threshold of a wireless communication channel is provided.

Figure 1:
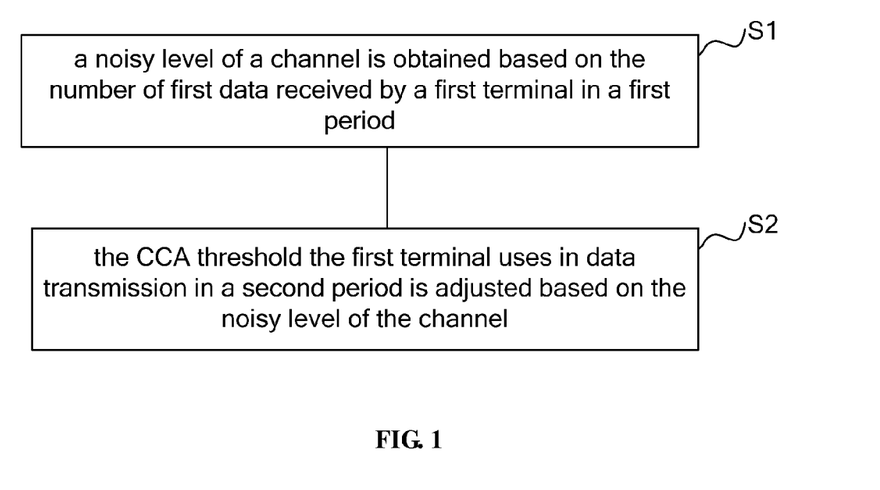
FIG. 1 schematically illustrates a flow chart of a method for controlling a CCA threshold according to an embodiment of the disclosure.

Referring to FIG. 1, in S1, a noisy level of a channel is obtained based on the number of first data received by a first terminal in a first period.

The first data include aggregation frames or non-aggregation frames. In some embodiments, the aggregation frame may be one selected from aggregation-media access control protocol data unit (A-MPDU), aggregation-media access control service data unit (A-MSDU) or a combined aggregation frame, where the combined aggregation frame may be a multi-level aggregation frame consisting of media access control protocol data unit (MPDU) and media access control service data unit (MSDU). In some embodiments, the non-aggregation frame may be MPDU.

In some embodiments, the first terminal is a STA or an AP in a wireless network.

To adjust the CCA threshold according to the noisy level of the channel, a time range may be divided into a plurality of time interval sequences, i.e., a plurality of time periods. Based on statistical data of MPDUs received by the STA or AP in a current time period, the noisy level of the channel may be determined, and further the CCA threshold may be adjusted accordingly in a time period which is following and adjacent to the current time period based on the noisy level of the channel determined in the current time period.

In embodiments of the present disclosure, the first period is used to represent the current time period the STA or AP stays, and a second period is used to represent the time period which is following and adjacent to the current time period along a time axis.

In S2, the CCA threshold the first terminal uses in data transmission in a second period is adjusted based on the noisy level of the channel.

In some embodiments, the CCA threshold may be determined based on the noisy level of the channel, to improve the first terminal's ability of occupying the channel. For example, when the channel is relatively noisy in the first period, the CCA threshold in the second period needs to be adjusted according to a predetermined controlling value.

In some embodiments, based on the obtained noisy level of the channel, the CCA threshold in the second period may be adjusted adaptively, so that the first terminal may obtain an opportunity of accessing the channel in time when it needs to send data, which may enhance the terminal's competition ability of occupying a channel, and improve a throughput rate.

In order to clarify the objects, characteristics and advantages of the disclosure, embodiments of present disclosure will be described in detail in conjunction with accompanying drawings.

In some embodiments, a time may be divided into statistical time interval sequences with an interval of T. A current time interval with the length of T is the first time period, and a time interval which is following and adjacent to the current time interval is the second time period.

To adjust the CCA threshold the first terminal uses in data transmission in the next time period T based on the noisy level of the channel in the current time period T in real time, the time interval T may not be set too long. In some embodiments, the time interval T may be within a range from 100 ms to 500 ms, that is, the first period and the second period may be within a range from 100 ms to 500 ms. In some embodiments, the first period and the second period may be determined further based on practical experiment data, a state of the channel and practical requirements. In embodiments of the present disclosure, the first period and the second period may be not limited.

Figure 2:
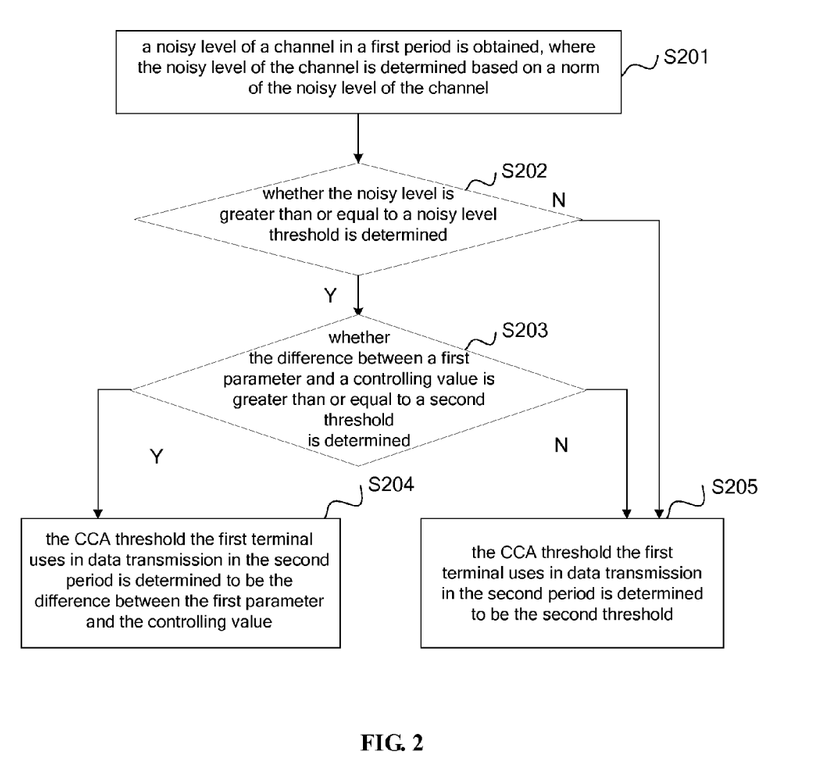
FIG. 2 schematically illustrates a flow chart of a method for controlling a CCA threshold according to an embodiment of the disclosure.

FIG. 2 schematically illustrates a flow chart of a method for controlling a CCA threshold according to an embodiment of the disclosure. Referring to FIG. 2, in S201, a noisy level of a channel in a first period is obtained, where the noisy level of the channel is determined based on a norm of the noisy level of the channel.

In some embodiments, the noisy level of the channel may be determined based on the number of first data received by a first terminal in the first period whose MAC target addresses are the first terminal.

In some embodiments, the noisy level of the channel may decrease with the increment of a first ratio calculated based on Equation (1), $$A = C/B \quad (1)$$

where A represents the first ratio, B represents the number of the first data received by the first terminal in the first period, and C represents the number of a first set of data among the first data received by the first terminal in the first period, where each MAC target address of the first set of data is the first terminal.

Hereinafter, determination of the noisy level of the channel is described in detail in conjunction with a formula.

In some embodiments, the noisy level of the channel may be determined based on the norm of the noisy level of the channel. The greater the norm is, the noisier the channel is.

Figure 3:
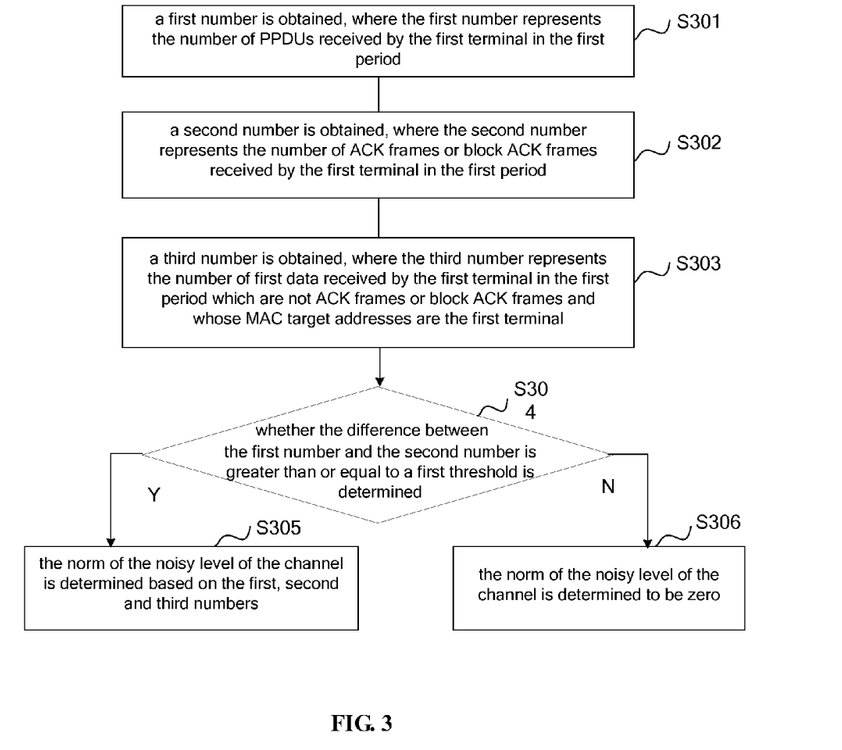
FIG. 3 schematically illustrates a flow chart of a method for determining a norm of a noisy level of a channel according to an embodiment of the disclosure.

FIG. 3 schematically illustrates a flow chart of a method for determining the norm of the noisy level of the channel according to an embodiment of the disclosure. Referring to FIG. 3, S301 to S303 may be performed to obtain related statistical data in determination of the norm of the noisy level of the channel.

In S301, a first number is obtained, where the first number represents the number of PPDUs received by the first terminal in the first period.

The first number is counted and represented by Rx_PPDU_Cnt.

In S302, a second number is obtained, where the second number represents the number of ACK frames or block ACK frames received by the first terminal in the first period.

The second number is counted and represented by Rx_ACK_Cnt.

ACK or block ACK is a message acknowledgement mechanism which is used to ensure the transmission reliability of air interface data.

During a message transmission process, to each IEEE802.11 message transmitted by a sending terminal (for example, the first terminal), a receiving terminal, after receiving it, needs to perform an ACK or block ACK acknowledgement. If receiving the ACK or block ACK acknowledgement, the sending terminal may determine that the message is successfully transmitted and send a next frame; else, the sending terminal may retransmit the message.

In S303, a third number is obtained, where the third number represents the number of the first data received by the first terminal in the first period which are not ACK frames or block ACK frames and whose MAC target addresses are the first terminal.

The third number is counted and represented by Rx_MPDU_Cnt.

In some embodiments, the first data are aggregation frames, and the third number represents the number of the aggregation frame received by the first terminal in the first period which are not ACK frames or block ACK frames and whose MAC target addresses are the first terminal. In some embodiments, the first data are non-aggregation frames, and the third number represents the number of the non-aggregation frame received by the first terminal in the first period which are not ACK frames or block ACK frames and whose MAC target addresses are the first terminal.

The third number may be obtained by using a filtering method based on frame types. For example, frames related to ACK or block ACK acknowledgement mechanisms may be filtered out, and a portion of the remained first data whose MAC target addresses are the first terminal is counted to obtain the third number.

The first terminal may obtain the first data based on the PPDU received from demodulation in the physical layer and upload the first data to a MAC layer. The first data whose MAC target addresses are the first terminal may be counted.

Based on the data obtained from S301 to S303, the norm of the noisy level of the channel may be obtained.

It should be noted that, S301 to S303 can be performed in any order to obtain the required statistical data.

After S301, S302 and S303, S304 is performed. In S304, whether the difference between the first number and the second number is greater than or equal to a first threshold is determined.

The first threshold may be determined based on experience data, experiment data and so on.

Based on experiment data, the first threshold may be set to be within a range from 1 to 10. In some embodiments, the first threshold may be determined based on practical experiment data, a state of the channel and so on, and is not limited here.

If the difference between the first number and the second number is greater than or equal to the first threshold, S305 is performed; else, S306 is performed.

In S305, the norm of the noisy level of the channel is determined based on the first, second and third numbers according to Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

In S306, the norm of the noisy level of the channel is determined to be zero.

As the first number represents the number of the PPDUs received by the first terminal in the first period, and the second number represents the number of ACK frames or block ACK frames received by the first terminal in the first period, the difference between the third number and the fourth number represents the number of the PPDUs received by the first terminal in the first period which are not ACK frames or block ACK frames. If the difference therebetween is relatively small, it indicates that the PPDUs received by the first terminal in the first period are almost data packets obtained by ACK or block ACK message acknowledgement mechanisms, and the noisy level of the channel has little interference on the statistical result. Under the message acknowledgement mechanisms, the channel is occupied by the first terminal, thus, the noisy level of the channel may be regarded as zero. That is, if the difference between the first number and the second number is less than the first threshold, the norm of the noisy level of the channel may be considered as zero.

Based on S301 to S306, the norm of the noisy level of the channel in the first period may be obtained.

Still referring to FIG. 2, after the norm of the noisy level of the channel is determined in S201, S202 may be performed.

In S202, whether the noisy level is greater than or equal to a noisy level threshold is determined.

It is found that, when the noisy level of the channel is relatively low, other terminals in a communication network may hardly impact data transmission of the first terminal. When the noisy level of the channel is relatively high, it indicates that there are multiple terminals in the communication network competing with the first terminal for occupying the channel. To enhance the first terminal's competition ability of occupying the channel and the first terminal's success rate of data transmission, the CCA threshold of the channel needs to be adjusted.

In some embodiments, the noisy level threshold is predetermined. When the noisy level of the channel is greater than or equal to the noisy level threshold, the noisy level of the channel is determined to be relatively high, and the CCA threshold of the channel may be adjusted accordingly in subsequent processes. When the noisy level of the channel is less than the noisy level threshold, the noisy level of the channel is determined to be relatively low, and a second predetermined threshold may be determined as the CCA threshold of the channel.

In some embodiments, the noisy level threshold may be determined based on experiment data. In some embodiments, the noisy level threshold may be within a range from 60% to 100%. In some embodiments, the noisy level threshold may be determined further based on practical experiment data, a state of the channel and so on.

In some embodiments, the second predetermined threshold may be a predetermined CCA threshold value. In some embodiments, a CCA threshold value suggested by IEEE 802.11 specifications may be taken as the second predetermined threshold. For example, based on suggestions in IEEE 802.11 specifications, under IEEE 802.11b and IEEE 802.11g standards, a suggested CCA threshold is −76 decibel relative to one milliwatt (dBm), thus, the second predetermined threshold value is determined as −76 dBm under IEEE 802.11b and IEEE 802.11g standards. Under IEEE 802.11n standard, a suggested CCA threshold is −62 dBm, thus, the second predetermined threshold value is determined as −62 dBm under IEEE 802.11n standard.

The second predetermined threshold value may be other reasonable values determined based on experiment data, and is not limited here.

If it is determined that the noisy level of the channel is greater than or equal to the noisy level threshold, S203 and subsequent steps may be performed, to realize adjustment of the CCA threshold. If it is determined that the noisy level of the channel is less than the noisy level threshold, the second predetermined threshold may be determined as the CCA threshold, that is, S205 is performed.

In S203, whether the difference between a first parameter and a controlling value is greater than or equal to a second threshold is determined.

In some embodiments, the CCA threshold the first terminal uses in data transmission in the second period according to a predetermined controlling value.

In some embodiments, a parameter related to powers of signals received by the first terminal in the first period may be determined. And based on a relation between the parameter and the controlling value, the CCA threshold the first terminal uses in data transmission in the second period may be adjusted.

In some embodiments, the parameter related to powers of signals received by the first terminal in the first period may be the first parameter.

In some embodiments, the first parameter may be determined based on powers or received signal strength indication (RSSI) values of PPDUs received by the first terminal in the first period.

In some embodiments, an average value of the powers of the PPDUs received by the first terminal in the first period may be determined as the first parameter in the first period.

Assume that when the PPDUs received in the first period which are transmitted by APs or STAs connected with the first terminal reach an antenna interface of the first terminal, there are N receiving powers which are represented by Pwr(i), where i is within a range from 1 to N.

An average value Pwr of the receiving powers is obtained based on Equation (3), $$Pwr = \frac{1}{N}\sum_{i=1}^{N} Pwr(i) \qquad (3)$$

where the average value Pwr represents the first parameter.

In some embodiments, an average value of the RSSI values of the PPDUs received by the first terminal in the first period may be taken as the first parameter in the first period.

The controlling value is a predetermined parameter for controlling the CCA threshold, which may be determined based on experiment data. In some embodiments, the controlling value may be within a range from 4 to 8. In some embodiments, the controlling value may be determined based on practical experiment data, a state of the channel and so on.

If it is determined that the difference between the first parameter and the controlling value is greater than or equal to the second threshold, S204 may be performed; else, S205 is performed.

In S204, the CCA threshold the first terminal uses in data transmission in the second period is determined to be the difference between the first parameter and the controlling value.

When the difference between the first parameter and the controlling value is greater than or equal to the second threshold, it indicates that the powers of the PPDUs received by the first terminal from another AP or STA which is connected with the first terminal are relatively high. To ensure a success rate of data transmission of the first terminal, the CCA threshold may be raised appropriately. Compared with an original CCA threshold, in the data transmission of the first terminal in the second period, the raised CCA threshold may be more prone to lead to a clear channel, which may enable the first terminal to obtain an opportunity of accessing the channel in time, and enhance the first terminal's competition ability of occupying the channel.

In some embodiments, based on the controlling value, the difference between the first parameter and the controlling value may be determined as the CCA threshold the first terminal uses in data transmission in the second period.

In S205, the CCA threshold the first terminal uses in data transmission in the second period is determined to be the second threshold.

In some embodiments, when the difference between the first parameter and the controlling value is less than the second threshold, the second threshold, for example, the CCA threshold value suggested by IEEE 802.11 specifications, may be determined as the CCA threshold the first terminal uses in data transmission in the second period.

If it is determined that the noisy level is less than the noisy level threshold in S202, it indicates that the noisy level of the channel is relatively low, that is, transmission performance of the channel is well. Therefore, it is unnecessary to adjust the CCA threshold value suggested by IEEE 802.11 specifications, that is to say, the CCA threshold the first terminal uses in data transmission in the second period may be remained as the second threshold in a communication system, which is performed in S205.

It should be noted that, in above embodiments, the current time period is considered as the first period, and a time period which is following and adjacent to the first period along a time axis is considered as the second period. Based on the norm of the noisy level of the channel in the current period, the CCA threshold in the following and adjacent period may be determined. To any time interval on the time axis, the CCA threshold therein can be determined based on the norm of the noisy level of the channel in a previous time interval. Similarly, the norm of the noisy level of the channel in a current time interval can be taken as a base in determination of the CCA threshold in a next time interval. Therefore, the CCA threshold in each time period can be adjusted flexibly according to the noisy level of the channel, so that when the first terminal needs to send data, the first terminal may obtain the opportunity of accessing the channel in a short time, which may enhance the competition ability of occupying the channel, and ensure a relatively high throughput rate effectively.

It should be noted that, in some embodiments, statistical data in the front of a time period may be obtained and used for adjustment in the back-end of the time period, which is also within the scope of the present disclosure.

Accordingly, in an embodiment, an apparatus for controlling a CCA threshold is provided.

Figure 4:
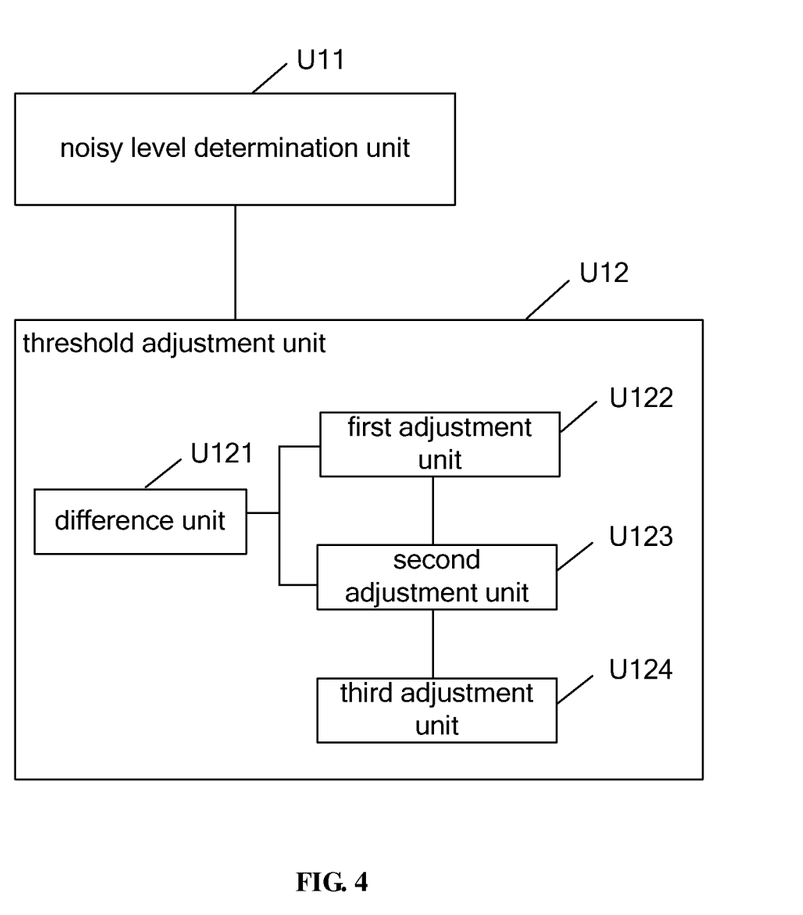
FIG. 4 schematically illustrates a structural diagram of an apparatus for controlling a CCA threshold according to an embodiment of the disclosure.

Referring to FIG. 4, the apparatus includes a noisy level determination unit U11 and a threshold adjustment unit U12.

The noisy level determination unit U11 may be configured to obtain a noisy level of a channel based on the number of first data received by a first terminal in a first period, where the first terminal is a STA or an AP in a wireless network, and the first data include aggregation frames or non-aggregation frames.

In some embodiments, the noisy level of the channel may decrease with the increment of a first ratio calculated based on Equation (1), $$A = C/B \quad (1)$$

where A represents the first ratio, B represents the number of the first data received by the first terminal in the first period, and C represents the number of a first set of data among the first data received by the first terminal in the first period, where each MAC target address of the first set of data is the first terminal.

The threshold adjustment unit U12 may be configured to adjust the CCA threshold the first terminal uses in data transmission in a second period based on the noisy level of the channel.

In some embodiments, the noisy level determination unit U11 may be configured to determine the noisy level of the channel based on a norm of the noisy level of the channel.

Figure 5:
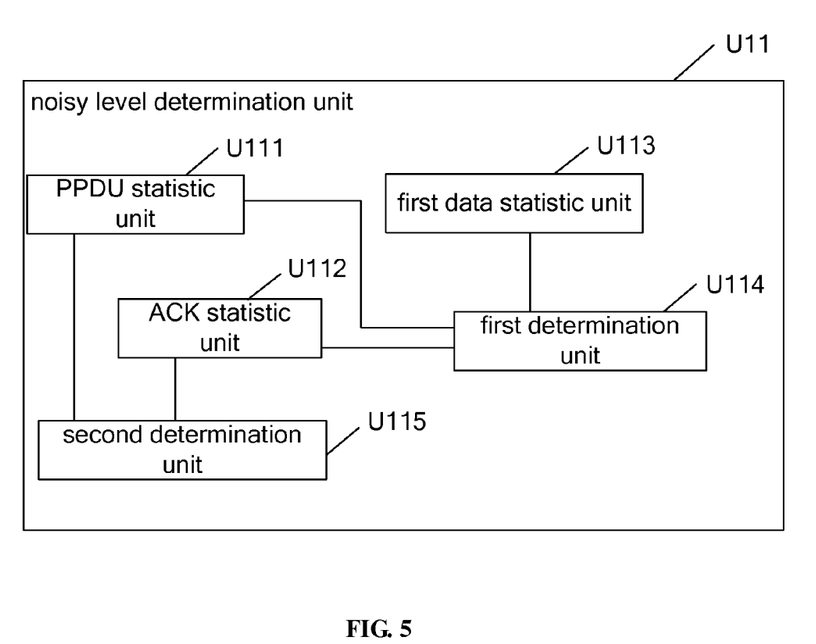
FIG. 5 schematically illustrates a structural diagram of a noisy level determination unit according to an embodiment of the disclosure.

FIG. 5 schematically illustrates a structural diagram of the noisy level determination unit U11 according to an embodiment of the disclosure. Referring to FIG. 5, the noisy level determination unit U11 includes a PPDU statistic unit U111, an ACK statistic unit U112, a first data statistic unit U113 and a first determination unit U114.

The PPDU statistic unit U111 may be configured to: obtain a first number, where the first number represents the number of PPDUs received by the first terminal in the first period.

The ACK statistic unit U112 may be configured to: obtain a second number, where the second number represents the number of ACK frames or block ACK frames received by the first terminal in the first period.

The first data statistic unit U113 may be configured to: obtain a third number, where the third number represents the number of the first data received by the first terminal in the first period which are not ACK frames or block ACK frames and whose MAC target addresses are the first terminal.

The first determination unit U114 may be configured to: if the difference between the first number and the second number is greater than or equal to a first threshold, determine the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

The noisy level determination unit U11 may further include a second determination unit U115, configured to: if the difference between the first number and the second number is less than the first threshold, determine the norm of the noisy level of the channel to be zero.

The threshold adjustment unit U12 may include a difference unit U121 and a first adjustment unit U122.

The difference unit U121 may be configured to obtain the difference between a first parameter and a predetermined controlling value, where the first parameter is related to powers or RSSI values of PPDUs received by the first terminal in the first period.

The first adjustment unit U122 may be configured to: if the noisy level of the channel is greater than or equal to a noisy level threshold, and the difference between the first parameter and the predetermined controlling value is greater than or equal to a second threshold, determine the CCA threshold to be the difference.

The threshold adjustment unit U12 may further include a second adjustment unit U123, configured to: if the noisy level of the channel is greater than or equal to the noisy level threshold, and the difference between the first parameter and the predetermined controlling value is less than the second threshold, determine the CCA threshold to be the second threshold.

The threshold adjustment unit U12 may further include a third adjustment unit U124, configured to: if the noisy level of the channel is less than the noisy level threshold, determine the CCA threshold to be the second threshold.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for controlling a clear channel assessment (CCA) threshold of a wireless communication channel, comprising:
    obtaining a noisy level of the channel based on the number of first data received by a first terminal in a first period, where the first terminal is a station (STA) or an access point (AP) in a wireless network, and the first data comprise aggregation frames or non-aggregation frames; and
    adjusting the CCA threshold the first terminal uses in data transmission in a second period based on the noisy level of the channel,
wherein adjusting the CCA threshold in the second period based on the noisy level of the channel comprises: when the noisy level of the channel is greater than or equal to a noisy level threshold, adjusting the CCA threshold the first terminal uses in data transmission in the second period according to a predetermined controlling value.

2. The method according to claim 1, wherein the noisy level of the channel decreases with the increment of a first ratio calculated based on Equation (1), $$A = C/B \quad (1)$$

where A represents the first ratio, B represents the number of the first data received by the first terminal in the first period, and C represents the number of a portion of the first data received by the first terminal in the first period, where a MAC target address of the portion of the first data is the first terminal.

3. The method according to claim 1, wherein the noisy level of the channel is determined based on a norm of the noisy level of the channel, and the norm of the noisy level of the channel is determined by:
    obtaining a first number, where the first number represents the number of physical layer protocol data units (PPDUs) received by the first terminal in the first period;
    obtaining a second number, where the second number represents the number of Acknowledgement (ACK) frames or block ACK frames received by the first terminal in the first period;
    obtaining a third number, where the third number represents the number of the first data received by the first terminal in the first period which are not ACK frames or block ACK frames and whose MAC target addresses are the first terminal; and
    if the difference between the first number and the second number is greater than or equal to a first threshold, determining the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

4. The method according to claim 3, further comprising: if the difference between the first number and the second number is less than the first threshold, determining the norm of the noisy level of the channel to be zero.

5. The method according to claim 3, wherein the first threshold is within a range from 1 to 10.

6. The method according to claim 1, wherein adjusting the CCA threshold according to the predetermined controlling value comprises: if the difference between a first parameter and the controlling value is greater than or equal to a second threshold, determining the CCA threshold to be the difference, where the first parameter is related to powers or signal strength indication values of the PPDUs received by the first terminal in the first period.

7. The method according to claim 6, wherein the first parameter comprises an average value of the powers or an average value of the signal strength indication values of the PPDUs received by the first terminal in the first period.

8. The method according to claim 6, wherein adjusting the CCA threshold according to the predetermined controlling value further comprises: if the difference between the first parameter and the controlling value is less than the second threshold, determining the CCA threshold to be the second threshold.

9. The method according to claim 6, wherein the second threshold is a predetermined CCA threshold value.

10. The method according to claim 1, wherein adjusting the CCA threshold in the second period based on the noisy level of the channel further comprises: when the noisy level of the channel is less than the noisy level threshold, determining the CCA threshold to be a second threshold.

11. The method according to claim 10, wherein the second threshold is a predetermined CCA threshold value.

12. The method according to claim 1, wherein the noisy level threshold is within a range from 0.6 to 1.

13. An apparatus for controlling a clear channel assessment (CCA) threshold of a wireless communication channel, comprising:
    a noisy level determination circuitry, configured to obtain a noisy level of the channel based on the number of first data received by a first terminal in a first period, where the first terminal is a station (STA) or an access point (AP) in a wireless network, and the first data comprise aggregation frames or non-aggregation frames; and
    a threshold adjustment circuitry, configured to adjust the CCA threshold the first terminal uses in data transmission in a second period based on the noisy level of the channel, wherein the threshold adjustment circuitry is configured to: adjust the CCA threshold the first terminal uses in data transmission in the second period according to a predetermined controlling value, when the noisy level of the channel is greater than or equal to a noisy level threshold.

14. The apparatus according to claim 13, wherein the noisy level of the channel decreases with the increment of a first ratio calculated based on Equation (1), $$A = C/B \qquad (1)$$

where A represents the first ratio, B represents the number of the first data received by the first terminal in the first period, and C represents the number of a portion of the first data received by the first terminal in the first period, where a MAC target address of the portion of the first data is the first terminal.

15. The apparatus according to claim 13, wherein the noisy level determination circuitry is configured to determine the noisy level of the channel based on a norm of the noisy level of the channel, and comprises:
   a physical layer protocol data unit (PPDU) statistic circuitry, configured to: obtain a first number, where the first number represents the number of PPDUs received by the first terminal in the first period;
   an Acknowledgement (ACK) statistic circuitry, configured to: obtain a second number, where the second number represents the number of ACK frames or block ACK frames received by the first terminal in the first period;
   a first data statistic circuitry, configured to: obtain a third number, where the third number represents the number of the first data received by the first terminal in the first period which are not ACK frames or block ACK frames and whose MAC target addresses are the first terminal; and
   a first determination circuitry, configured to: if the difference between the first number and the second number is greater than or equal to a first threshold, determine the norm of the noisy level of the channel based on Equation (2), $$\text{CCA\_Freq} = 1 - \frac{\text{Rx\_MPDU\_Cnt}}{\text{Rx\_PPDU\_Cnt} - \text{Rx\_ACK\_Cnt}} \qquad (2)$$

where CCA_Freq represents the norm of the noisy level of the channel, Rx_PPDU_Cnt represents the first number, Rx_ACK_Cnt represents the second number, and Rx_MPDU_Cnt represents the third number.

16. The apparatus according to claim 15, wherein the noisy level determination circuitry further comprises a second determination circuitry, configured to: if the difference between the first number and the second number is less than the first threshold, determine the norm of the noisy level of the channel to be zero.

17. The apparatus according to claim 13, wherein the threshold adjustment circuitry comprises:
   a difference circuitry, configured to: obtain the difference between a first parameter and a predetermined controlling value, where the first parameter is related to powers or signal strength indication values of PPDUs received by the first terminal in the first period; and
   a first adjustment circuitry, configured to: if the noisy level of the channel is greater than or equal to the noisy level threshold, and the difference between the first parameter and the predetermined controlling value is greater than or equal to a second threshold, determine the CCA threshold to be the difference.

18. The apparatus according to claim 17, wherein the threshold adjustment circuitry further comprises a second adjustment circuitry, configured to: if the noisy level of the channel is greater than or equal to the noisy level threshold, and the difference between the first parameter and the predetermined controlling value is less than the second threshold, determine the CCA threshold to be the second threshold.

19. The apparatus according to claim 17, wherein the threshold adjustment circuitry further comprises a third adjustment circuitry, configured to: if the noisy level of the channel is less than the noisy level threshold, determine the CCA threshold to be the second threshold.

* * * * *